Patented Sept. 14, 1954

2,688,840

UNITED STATES PATENT OFFICE 2,688,840

PARAFFIN HYDROCARBON FUEL FOR AND METHOD OF OPERATING PULSE JET ENGINES

Robert M. Schirmer, Harold T. Quigg, and Sylvester C. Britton, Bartlesville, Okla., assignors to Phillips Petroleum Company, a corporation of Delaware No Drawing. Application December 29, 1947, Serial No. 794,428

15 Claims. (Cl. 60—35.4)

This invention relates to jet engine fuel. In one of its more specific aspects it relates to improved pulse jet engine fuel. In another of its more specific aspects it relates to a method for operating pulse jet engines.

A pulse jet engine is an intermittent, compressorless, aerodynamic power plant. The engine is composed of a shaped tube fitted with one-way flow check valves at the forward end. Unlike typical reciprocating internal combustion engines the problem of knocking is not one of its difficulties of operation. In diesel engines, which are classified as compression ignition engines, the difficulty of attaining constant pressure heat addition presents a problem of high importance. The problem presented in the operation of the pulse jet engine is, however, diametrically opposite. It is desirable in the operation of a pulse jet engine to attain the most rapid possible pressure rise. It is thus desirable to provide a fuel for a pulse jet engine which will have the shortest possible burning time, the greatest combustion heat output, and one which will produce the greatest forward thrust.

The pulse jet engine comprises few or none of the mechanical features of stationary power plants. The engine is, as above stated, composed of a shaped tube fitted with one-way check valves at the forward end. Some conventional valves comprise thin sheets of spring metal which are attached so as to close on metal seats. The tube is so constructed that air flows successively through an entrance venturi, past the flow check valves and valve blade shield into a cylindrical combustion zone of fixed size. The engine is started by forcing air through a mixture zone where fuel and air are mixed. The fuel-air mixture is then introduced into the primary combustion zone. Initial ignition for the fuel is provided by a spark producing attachment, such as a conventional spark plug mounted in the wall of the combustion chamber. The resulting explosion closes the flow check valves, thus preventing continuous combustion of fuel which is continuously injected into admixture with air in a mixing zone ahead of the primary combustion zone. The explosion forces the combustion gases outwardly through a transition cone and a tail pipe, exhausting to the atmosphere. Inertia effects of the gases in the tail pipe cause the portion of combustion gas remaining in the combustion zone to expand below the pressure of the surrounding atmosphere. Pressure of the air and fuel charge, which exceeds the reduced pressure within the combustion zone, causes the flow check valves to open so as to allow the passage of another charge of fuel and air into the primary combustion zone. The fuel is thought to be ignited by heat from the hot combustion gases remaining in the combustion zone. The cycle comprising fuel-air injection, combustion and exhaust repeats itself with a frequency of from 30 to 400 cycles per second depending upon the size of unit, valve design, fuel, and other factors. Once started, the operation proceeds without necessity of ram air or operation of a spark producing attachment.

An object of the invention is to provide an improved fuel for use in pulse jet engines. Another object is to provide a fuel which ignites with the least possible delay. Another object is to provide a fuel which burns with the greatest possible efficient heat output. Another object is to provide a fuel which has a high rate of flame propagation. Another object is to provide an improved method for operating pulse jet engines. Another object is to provide a pulse jet engine fuel which will give a maximum of thrust per unit of fuel consumed. Another object is to provide a fuel which will operate efficiently in pulse jet engines and will ignite in the shortest possible time. Other and further objects and advantages will be apparent upon study of the accompanying discussion and the claims.

From a consideration of the basic principles of operation of a pulse jet engine it is quite evident that the more rapid the rate of combustion the easier the engine will start. That result probably occurs because of the fact that an explosion of considerable violence must take place in order to create a low pressure area in the combustion chamber and thus start the series of pulsations necessary for engine operation.

In addition to the fact that it is desirable that the rate of combustion of the fuel should be explosive, we have discovered that best operating results are obtained when the fuel also has a high heat release, but not so high that it substantially reduces valve life. A high heat release will result in greater expansion of the combustion gas which results from the burning of the fuel. A greater intensity of shock wave is thus obtained by increasing the volume of combustion gas which is exhausted from the combustion chamber and thus in turn increases the thrust effect of the escaping gas.

We have discovered that hydrocarbons which are not generally used as fuels for reciprocating internal combustion engines may be used with excellent effect in the operation of pulse jet engines. Normal paraffins boiling in the range between 90° F. and about 500° F. furnish those characteristics of high heat release found to be so desirable in pulse jet fuels. It is preferred to use those normal paraffins as a pulse jet fuel which boil in the range of between 150° F. and 350° F. Normal paraffins boiling between 350° F. and 500° F. may be satisfactorily utilized as pulse jet fuels by properly atomizing the fuel before its injection into the primary combustion zone for burning. As was pointed out in co-pending application Serial No. 794,427, filed December 29, 1947, by two of us, it is believed that a fuel comprising essentially normal paraffins boiling below 150° F. is injurious to the flow check valves of a pulse jet engine and shortens the life of such valves to a greater extent than does a fuel comprising essentially a hydrocarbon stock and containing normal paraffins boiling within the range of from 150° F. to 500° F. We have now discovered, however, that a more reactive fuel which has many of the advantages of the lower boiling fuel can be produced by mixing a portion of normal paraffins boiling between 20° F. and 150° F. with normal paraffins boiling between 150° F. and 500° F. so as to comprise the hydrocarbon stock of a pulse jet engine fuel. Such a fuel has markedly better start-up characteristics than does a fuel comprising a hydrocarbon stock which excludes these lower boiling normal paraffins. We have found that while the starting characteristics of the mixed fuel are improved by the addition of the lower boiling normal paraffins, the valve life of pulse jet engines is substantially unaffected by the addition.

We have further found that most efficient pulse jet engine operation may be obtained by operating such an engine on a fuel which comprises essentially a hydrocarbon stock and which contains between 75 percent and 85 per cent by volume normal paraffins boiling in the range of between 150° F. and 350° F. and between 5 and 20 per cent by volume of normal paraffins boiling in the range of between 20° F. and 150° F. Operation of a given pulse jet engine on a fuel comprising a hydrocarbon stock containing between 50 per cent and 85 per cent by volume of normal paraffins boiling in the range of between 150° F. and 350° F. and between 5 per cent and 20 per cent by volume normal paraffins boiling in the range of between 20° F. and 150° F. will also produce excellent results. The addition of a low boiling normal paraffins fraction to a pulse jet engine fuel comprising a hydrocarbon stock boiling within the range of between 150° F. and 500° F. is especially beneficial because of the fact that the higher boiling normal paraffins have poorer start-up characteristics and require during operation more complete mechanical atomization than do the lower boiling fuels.

It may be necessary, on occasion, to operate a pulse jet engine for a comparatively long period of time while at the same time have a rather limited fuel capacity. Under such conditions the desired length of time for operation of the pulse jet engine, together with the shortage of fuel capacity space, may out-weigh a desire for the highest efficiency of operation in the determination of a fuel mixture for the pulse jet engine. Aromatics or substituted aromatics boiling in the range of between 175° F. and 350° F. have a high heat release per unit volume. Inasmuch as it may be desirable to get the greatest economical amount of heat release from a limited fuel load it may be desirable to mix selected aromatics boiling within the above boiling range with normal paraffins boiling within the range of between 150° F. and 500° F. together with a smaller fraction of normal paraffins boiling within the range of between 20° F. and 150° F. A fuel mixture which comprises essentially a hydrocarbon stock and containing between 50 per cent and 85 per cent by volume of normal paraffins boiling in the ranges of between 150° F. and 350° F. or 150° F. and 500° F. and between 5 per cent and 20 per cent by volume normal paraffins boiling within the range of between 20° F. and 150° F. together with 10 per cent to 45 per cent by volume of aromatics boiling within the range of 175° F. to 350° F. provides a high ratio of heat release for a relatively small fuel volume and one which has excellent start-up characteristics. Specific normal paraffins which may be utilized for at least 50 per cent by volume of the hydrocarbon stock of a pulse jet engine fuel may include normal hexane, normal heptane, normal octane and normal decane. Normal paraffins which may be utilized to make up the 5 to 20 per cent normal paraffins of a hydrocarbon stock for pulse jet engine fuels may be butane and/or pentane. Aromatics such as benzene and toluene and/or substituted aromatics such as cumene may make up the 10 to 45 per cent aromatic portion of the fuel volume.

It is preferred that the composite pulse jet fuel contain substantially no isoparaffinic material. In view of the fact that it is practically impossible to eliminate all isoparaffins in commercial distillation systems, it will usually be found necessary, however, to tolerate up to about 10 per cent by volume of isoparaffins in the finished fuel. Other non-deleterious materials may also go to make up a portion of the finished fuel. Some materials which may be utilized with our preferred fuel are nitro-paraffins, nitro-aromatics, ketones, ethers and alcohols. Such materials may make up as much as 30 per cent by volume of the finished material. It is, however, preferred to limit those materials to an amount not exceeding 10 per cent by volume of the finished fuel.

Pulse jet engines are operated with the greatest efficiency when the fuels discussed hereinbefore are supplied to a given engine at fuel-air ratios ranging between .01 and .08. It is within the scope of this invention to operate a pulse jet engine with our preferred fuel mixed with oxygen. If oxygen or an oxygen-supplying compound, such as a peroxide, is used rather than another oxygen-supplying gas, such as air, the fuel-air ratios would necessarily have to be adjusted accordingly, so as to maintain a fuel-oxygen ratio equivalent to the fuel-air ratios disclosed herein. It is preferred to operate a pulse jet engine by supplying the fuel to such an engine at a fuel-air ratio ranging between .03 and .07. Much difficulty is encountered in attempting to measure the exact amount of air actually supplied to a pulse jet engine because of the fact that up to about 30 per cent by volume of air may enter the combustion zone through the engine tail pipe or exhaust zone. A given pulse jet engine may be operated in a range of between 30 and 400 cycles per second, depending upon the size of the engine. Progressively larger engines operate at progressively lower cycle rates. By the term "cycle" we mean to include the steps of introducing the fuel-air charge into a primary combustion zone and igniting the fuel charge so as to produce an explosion which in turn produces a shock wave. The shock wave closes the flow check valves ahead of the flame front, preventing the flame from following the fuel-air mixture into the mixing zone, and carries a portion of the combustion gas out of the combustion zone through an exhaust zone from which it is exhausted to the surrounding atmosphere. Inertia of the combustion gas passing from the combustion zone causes a decrease in pressure of the gas remaining within the combustion zone to a pressure below that of the surrounding atmosphere. Pressure of the surrounding atmosphere which is greater than the reduced pressure in the combustion zone causes the flow check valves to open, thus permitting another charge of fuel-air mixture to flow into the primary combustion zone and thus starting another cycle. The fuel-air mixture is thought to be ignited by heat from the combustion gas remaining in the combustion zone, though there are other theories as to just what causes the fuel charge to ignite. Another cycle of intermittent operation of the engine is thus begun. As has been pointed out above, it is highly desirable to get the greatest possible heat release from a given pulse jet engine without substantially shortening the valve life of the engine. Operation of the pulse jet engines at the above mentioned conditions will result in a "temperature rise" in the engine which may range from about 800° F. to about 4500° F. By "temperature rise" we mean that rise of temperature taken between the inlet end of the engine and ranging to the highest temperature of the gas passing from the engine tail pipe or exhaust zone.

Advantages of using the above described fuel in the operation of a pulse jet engine will be obvious upon study of the following specific examples. Fuel proportions used in these specific examples are merely exemplary and should not be construed to unduly limit the invention.

SPECIFIC EXAMPLES

Various fuels were tested to determine their starting characteristics and in several cases a normal paraffinic material boiling within the range of 20° F. to 150° F. was added to higher boiling components to make blends from which direct comparison of starting characteristics could be made. Several other commercial fuels were tested which contained considerable quantities of low boiling natural gasoline. The tests were conducted on a thrust stand using two different representative pulse jet engines. Results of the tests are recorded below in Tables I and II.

Table I

STARTING CHARACTERISTICS OF VARIOUS FUELS IN ENGINE "A"

| Fuel | Time Required to Start, Minutes |
|---|---|
| (1) Normal Heptane | 2.0 |
| (2) 10% Normal Pentane in Normal Heptane | 0.1 |
| (3) Unleaded Gasoline | 0.1 |

Table II

STARTING CHARACTERISTICS OF VARIOUS FUELS IN ENGINE "B"

| Fuel | Time Required to Start, Minutes |
|---|---|
| (1) Normal Heptane | 3.0 |
| (2) 10% Normal Pentane in Normal Heptane | 0.1 |
| (3) Kerosene | (1) |
| (4) 25% Normal Pentane and 25% Normal Heptane in Kerosene | 2.0 |
| (5) Unleaded Gasoline | 0.1 |
| (6) Stove and Lamp Fluid | 0.3 |
| (7) Stoddard Solvent | 12.0 |

[1] No start after 15 min. try.

Various fuels were tested to determine the effective operating life of valve elements of pulse jet engines operating with these fuels. The tests were conducted on a thrust stand using two different representative pulse jet engines. Results of the tests are recorded below in Tables III and IV.

Table III

EFFECT OF VARIOUS FUELS ON VALVE BLADE LIFE IN ENGINE "A"

| Fuel | Relative Valve Blade Life |
|---|---|
| (1) Normal Heptane | 25 |
| (2) 10% Normal Pentane in Normal Heptane | 25 |
| (3) Unleaded gasoline | 15 |
| (4) Iso Octane | 05 |

Table IV

EFFECT OF VARIOUS FUELS ON VALVE BLADE LIFE IN ENGINE "B"

| Fuel | Relative Valve Blade Life |
|---|---|
| (1) Normal Pentane [1] | 100 |
| (2) Normal Heptane [1] | 125 |
| (3) 10% Normal Pentane [1] in Normal Heptane | 125 |
| (4) Unleaded Gasoline | 25 |

[1] These fuels consist predominately of normal paraffins (85 percent or more); other fuels contain appreciably greater quantities of iso-paraffins, olefins, cycloparaffins, and aromatics.

Comparison of the results of the various tests will disclose the fact that the addition of 10 per cent normal pentane to the higher boiling normal paraffin, normal heptane, resulted in the same relative valve blade life in each of the two pulse jet engines. Use of normal pentane as a fuel in engine B resulted in a substantially reduced relative valve blade life as did the use of unleaded gasoline in engines A and B.

As will be evident to those skilled in the art, various modifications of the invention can be made or followed in the light of the foregoing disclosure, discussion, and examples without departing from the spirit or scope of the disclosure or from the scope of the claims.

We claim:
1. An improved method for operating a pulse jet engine which comprises the steps of injecting fuel together with air into the forward portion of a primary combustion zone of fixed size, said fuel comprising essentially a hydrocarbon stock having not more than 10 per cent by volume iso-paraffins and containing at least 50 per cent by volume normal paraffins boiling in the range of between 150° F. and 500° F. and between 5 per cent and 20 per cent by volume normal paraffins boiling in the range of between 20° F. and 150° F.; igniting said fuel mixture, whereby a shock wave is produced by the resulting explosion; exhausting the resulting combustion gas through a rearwardly extending exhaust zone; and intermittently repeating the cycle of fuel-air injection, combustion, and exhaust so as to produce a temperature rise in said engine ranging between 800° F. and 4500° F.

2. An improved method for operating a pulse jet engine which comprises the steps of injecting a fuel together with air into the forward portion of a combustion zone of fixed size, said fuel comprising essentially a hydrocarbon stock having not more than 10 per cent by volume isoparaffins and containing between 50 per cent and 85 per cent by volume normal paraffins boiling in the range of between 150° and 500° F. and between 5 percent and 20 per cent by volume normal paraffins boiling in the range of between 20° F. and 150° F. and between 10 per cent and 45 per cent by volume aromatics boiling within the range of between 175° F. and 350° F.; igniting said fuel mixture, whereby a shock wave is produced by the resulting explosion; exhausting resulting combustion gas through an exhaust zone; and intermittently repeating the cycle of fuel-air injection, combustion, and exhaust so as to produce a temperature rise in said engine ranging between 800° F. and 4500° F.

3. The method of claim 1, wherein said hydrocarbon stock contains at least 50 per cent by volume normal paraffins boiling in the range of between 150° F. and 350° F. and between 5 per cent and 20 per cent by volume normal paraffins boiling in the range of between 20° F. and 150° F.; and injecting said fuel into said combustion zone at a fuel-air ratio between .03 and .07.

4. The method of claim 1, wherein said fuel is mixed with oxygen in a fuel-oxygen ratio equivalent to a fuel-air ratio between .01 and .08.

5. The method of claim 1, wherein said normal paraffins comprising at least 50 per cent volume of a hydrocarbon stock consists of normal heptane; and injecting said fuel into said combustion zone at a fuel-air ratio between .03 and .07.

6. The method of claim 1, wherein said paraffins comprising at least 50 per cent by volume of a hydrocarbon stock consist of a mixture of at least two normal paraffins boiling within the range of between 150° F. and 500° F.; and injecting said fuel into said combustion zone at a fuel-air ratio between .03 and .07.

7. The method of claim 2, wherein said hydrocarbon stock contains at least 50 per cent by volume normal paraffins boiling in the range of between 150° F. and 350° F. and between 5 per cent and 20 per cent by volume normal paraffins boiling in the range of between 20° F. and 150° F.; and injecting said fuel into said combustion zone at a fuel-ratio between .03 and .07.

8. The method of claim 2, wherein said normal paraffins comprising at least 50 per cent volume of a hydrocarbon stock consists of normal heptane; and injecting said fuel into said combustion zone at a fuel-air ratio between .03 and .07.

9. The method of claim 2, wherein said paraffins comprising at least 50 per cent by volume of a hydrocarbon stock consists of a mixture of at least two normal paraffins boiling within the range of between 150° F. and 500° F.; and injecting said fuel into said combustion zone at a fuel-air ratio between .03 and .07.

10. A jet engine fuel which comprises essentially a hydrocarbon stock having not more than 10 per cent by volume isoparaffins and containing between 50 per cent and 85 per cent by volume normal paraffins boiling in the range of between 150° F. and 350° F., and between 5 per cent and 20 per cent by volume normal paraffins boiling in the range of between 20° F. and 150° F.; and between 10 per cent and 45 per cent aromatics boiling between 175° F. and 350° F.

11. In a method of operating a pulse jet engine having a combustion zone of fixed size which is constantly open at its rear end and which is so adapted at the forward portions as to allow the passage of fuel and air thereinto, wherein said fuel is intermittently ignited at a rate of between 30 and 400 cycles per second; the improvement which comprises supplying as the fuel for said engine a fuel comprising essentially a hydrocarbon stock having not more than 10 per cent by volume isoparaffins and containing at least 50 per cent by volume normal paraffins boiling in the range of between 150° F. and 500° F. and between 5 per cent and 20 per cent by volume normal paraffins boiling in the range of between 20° F. and 150° F., in a fuel-air ratio between .01 and .08.

12. In a method of opertaing a pulse jet engine having a combustion zone of constant size which is constantly open at its rear end and which is so adapted at the forward portion as to allow the passage of fuel and air thereinto, wherein said fuel is intermittently ignited at a rate of between 30 and 400 cycles per second; the improvement which comprises supplying as the fuel for said engine a fuel comprising essentially a hydrocarbon stock having not more than 10 per cent by volume isoparaffins and containing between 50 per cent and 85 per cent by volume normal paraffins boiling in the range of between 150° F. and 500° F. and between 5 per cent and 20 per cent by volume normal paraffins boiling in the range of between 20° F. and 150° F., with between 10 per cent and 45 per cent by volume aromatics boiling between 175° F. and 350° F., in a fuel-air ratio between .01 and 0.8.

13. A jet engine fuel which comprises essentially a hydrocarbon stock having not more than 10 per cent by volume isoparaffins and containing at least 50 per cent by volume normal paraffins boiling in the range of between 150° F. and 500° F., and between 5 per cent and 20 per cent by volume normal paraffins boiling in the range of between 20° F. and 150° F.; and between 10 per cent and 45 per cent aromatics boiling between 175° F. and 350° F.

14. An improved method for operating a jet engine which comprises injecting into said engine under operating conditions a fuel together with air, said fuel comprising essentially a hydrocarbon stock having not more than 10 per cent by volume isoparaffins and containing at least 50 per cent by volume of normal paraffins boiling in the range of 150° F. and 500° F., between 5 per cent and 20 per cent by volume of normal paraffins boiling in the range of between 20° F. and 150° F., and between 10 per cent and 45 per cent aromatics boiling between 175° F. and 350° F.; burning said fuel in said jet engine; and exhausting the resulting combustion gas through a rearwardly extending exhaust zone.

15. An improved method for operating a jet engine which comprises injecting into said jet engine under operating conditions a fuel together with air, said fuel comprising essentially a hydrocarbon stock having not more than 10 per cent by volume isoparaffins and containing between 50 per cent and 85 per cent by volume normal paraffins boiling in the range of between 150° F. and 350° F., between 5 per cent and 20 per cent by volume normal paraffins boiling in the range of between 20° F. and 150° F., and between 10 per cent and 45 per cent aromatics boiling between 175° F. and 350° F.; burning said fuel in said jet engine; and exhausting the resulting combustion gas through a rearwardly extending exhaust zone.

References Cited in the file of this patent

UNITED STATES PATENTS

| Number | Name | Date |
|---|---|---|
| 1,495,501 | Taber | May 27, 1924 |
| 1,868,102 | Henderson et al. | July 19, 1932 |
| 1,988,061 | Wagner | Jan. 15, 1935 |
| 2,032,330 | Roberts et al. | Feb. 25, 1936 |
| 2,142,601 | Bleecker | Jan. 3, 1939 |
| 2,190,480 | Nichols | Feb. 13, 1940 |
| 2,249,461 | Diwoky | July 15, 1941 |
| 2,396,566 | Goddard | Mar. 12, 1946 |
| 2,563,305 | Britton et al. | Aug. 7, 1951 |

FOREIGN PATENTS

| Number | Country | Date |
|---|---|---|
| 330,593 | Great Britain | June 10, 1930 |
| 386,908 | Great Britain | Jan. 26, 1933 |
| 450,957 | Great Britain | Oct. 24, 1934 |
| 598,726 | France | Feb. 27, 1925 |
| 920,910 | France | Jan. 8, 1947 |

OTHER REFERENCES

Bulletin No. 19, issued by the Kansas City Testing Laboratory, Kansas City, Mo., August 1, 1925.

Journal of the Institute of Petroleum, vol. 26 (1940), pp. 296, 299, 303, article by Smittenberg et al.

Proceedings of 24th Ann. Meeting, American Petroleum Institute, vol. 24 (II), (1943), pages 34-48, article by Forziati et al.

Journal of the American Rocket Society No. 62, June 1945, page 5.

"The Chemical Constituents of Petroleum," Sachanen (1945), pages 218, 221, 222.

SAE Quarterly Transactions, vol. 1, No. 2, April 1947, pages 204-216, article by Edelman.